(12) United States Patent
Fauteux et al.

(10) Patent No.: US 12,261,289 B2
(45) Date of Patent: *Mar. 25, 2025

(54) LITHIUM-ION BATTERIES

(71) Applicant: Techtronic Cordless GP, Anderson, SC (US)

(72) Inventors: Denis Gaston Fauteux, Kwai Chung (HK); Aditya Subramanian, Kwai Chung (HK)

(73) Assignee: Techtronic Cordless GP, Anderson, SC (US)

( * ) Notice: Subject to any disclaimer, the term of this patent is extended or adjusted under 35 U.S.C. 154(b) by 182 days.

This patent is subject to a terminal disclaimer.

(21) Appl. No.: 17/832,035

(22) Filed: Jun. 3, 2022

(65) Prior Publication Data

US 2022/0302495 A1 Sep. 22, 2022

Related U.S. Application Data

(63) Continuation of application No. 16/827,365, filed on Mar. 23, 2020, now Pat. No. 11,404,717.

(51) Int. Cl.
*H01M 4/38* (2006.01)
*H01M 4/134* (2010.01)
*H01M 4/36* (2006.01)
*H01M 4/505* (2010.01)
*H01M 4/525* (2010.01)
*H01M 4/583* (2010.01)
(Continued)

(52) U.S. Cl.
CPC ........ *H01M 4/386* (2013.01); *H01M 4/134* (2013.01); *H01M 4/366* (2013.01); *H01M 4/505* (2013.01); *H01M 4/525* (2013.01); *H01M 4/583* (2013.01); *H01M 4/62* (2013.01); *H01M 10/0525* (2013.01); *H01M 10/0566* (2013.01)

(58) Field of Classification Search
None
See application file for complete search history.

(56) References Cited

U.S. PATENT DOCUMENTS 11,404,717 B2 * 8/2022 Fauteux ............... H01M 4/366
2002/0192552 A1  12/2002 Lampe-Onnerud et al.
(Continued)

FOREIGN PATENT DOCUMENTS

JP  2015524993 A  8/2015
JP  2018170272 A  11/2018
WO  WO-2018071846 A1  4/2018

OTHER PUBLICATIONS

Canadian Intellectual Property Office, Official Action issued for Canadian Patent Application No. 3,176,118, dated Feb. 6, 2024, 6 pages.
(Continued)

*Primary Examiner* — Laura Weiner
(74) *Attorney, Agent, or Firm* — Norton Rose Fulbright US LLP (57) ABSTRACT

Systems and methods which provide lithium-ion battery configurations with high energy density are disclosed. Embodiments provide lithium-ion batteries comprising an anode that includes 30 to 85 wt. % silicon, thereby facilitating high energy density and high N:P ratio for the lithium-ion batteries. The high N:P ratio further enables fast charging and low temperature charging capabilities of the lithium-ion batteries.

14 Claims, 3 Drawing Sheets

(51) Int. Cl.
*H01M 4/62* (2006.01)
*H01M 10/0525* (2010.01)
*H01M 10/0566* (2010.01)

(56) References Cited

U.S. PATENT DOCUMENTS

| | | | |
|---|---|---|---|
| 2006/0141359 A1 | 6/2006 | Yanagida et al. | |
| 2008/0241647 A1 | 10/2008 | Fukui et al. | |
| 2011/0293991 A1 | 12/2011 | Ryu et al. | |
| 2012/0064409 A1* | 3/2012 | Zhamu | H01M 4/386 |
| | | | 429/223 |
| 2015/0311525 A1 | 10/2015 | Masarapu et al. | |
| 2017/0214103 A1 | 7/2017 | Onnerud et al. | |
| 2019/0027788 A1 | 1/2019 | Liu et al. | |
| 2019/0207200 A1 | 7/2019 | Zhamu et al. | |
| 2020/0161701 A1* | 5/2020 | Koike | H01M 4/366 |
| 2020/0274148 A1* | 8/2020 | Xiao | H01M 4/366 |

OTHER PUBLICATIONS

Patent Cooperation Treaty, International Search Report and Written Opinion issued for PCT Application No. PCT/IB2021/051096, dated May 18, 2021, 9 pages.

Dimitrios, G. "Techno-economical Feasibility Study on The Retrofit Of Mid-size Ro-Pax into Hybrid Ones/Battery Thermal and Energy Behavior Prediction," Thesis, Oct. 2017, [retrieved on Apr. 30, 2021). Retrieved from Internet: <URL: https://dspace.lib.ntua.gr/xmlui/handle/123456789/46052>; 5 pages.

European Patent Office, Communication Pursuant to Rule 164(1) EPC, Partial Supplementary European Search Report issued for European Patent Application No. 21774352.5, dated Jun. 5, 2024, 17 pages.

Baasner, A. et al. "The Role of Balancing Nanostructured Silicon Anodes and NMC Cathodes in Lithium-Ion Full-Cells with High Volumetric Energy Density," Journal of the Electrochemical Society, vol. 167 020516, 2020, 11 pages.

* cited by examiner

Silicon "Egg-yolk" Model
Dishcharged

FIG. 3A

Silicon "Egg-yolk" Model
Charged

LITHIUM-ION BATTERIES

CROSS REFERENCE

This application claims the benefit of priority of U.S. patent application Ser. No. 16/827,365, filed Mar. 23, 2020, which is now U.S. Pat. No. 11,404,717, and entitled "LITHIUM-ION BATTERIES," this disclosure of which is hereby incorporated herein by reference in its entirety.

TECHNICAL FIELD

The present invention relates generally to batteries. More particularly, the present invention relates to lithium-ion batteries configured to provide high power and high energy density with high thermal stability.

BACKGROUND OF THE INVENTION

The use of various forms of batteries has become nearly ubiquitous in today's world. As more and more portable or cordless devices, such as power tools (e.g., drills, saws, grass trimmers, blowers, sanders, etc.), small appliances (e.g., mixers, blenders, coffee grinders, etc.), communications devices (e.g., smartphones, personal digital assistants, etc.), and office equipment (e.g., computers, tablets, printers, etc.), are in widespread use, the use of battery technologies of varying chemistry and configuration is commonplace.

Lithium-ion battery (LiB) configurations have gained popularity in recent years for use with respect to portable or cordless devices, and electric vehicles. LiBs, although potentially providing a less stable chemistry (e.g., containing a flammable electrolyte) than battery configurations such as NiCd, nevertheless have a higher energy density and lower toxicity level than many rechargeable battery configurations (e.g., NiCd and NiMH (Nickel Metal Hydride)), typically have no memory effect, and experience low self-discharge and thus provide a rechargeable battery configuration commonly utilized in today's portable or cordless devices.

The size and weight of portable or cordless devices is often an important consideration. As the size and weight of an on-board rechargeable battery system, often including multiple individual batteries in the form of a battery pack, often contributes appreciably to the overall size and/or weight of the portable or cordless device, the size and weight of rechargeable batteries can be important in the design of the host devices. Such size and weight concerns are counterbalanced with the need for storage and delivery of sufficient power to enable the effective and desired use of the host portable or cordless device, or electric vehicles.

BRIEF SUMMARY OF THE INVENTION

Currently available lithium-ion batteries suffer from several drawbacks. For instance, graphite, as one of the most commonly used anode materials, has become one of the main limiting factors that prevents significant improvement in energy density of lithium ion batteries due to its limited capacity per unit volume and/or per unit weight. For instance, 100% fully lithiated graphite has a capacity of 330 to 372 mAh/g compared to 3400 to 4200 mAh/g for 100% fully lithiated silicon, although the way these materials are utilized in the field of battery fabrication does not constitute the full capacity thereof. As the demand for batteries with higher energy density persistently increases, other materials that have much higher capacities, such as silicon, have been used as an additive to graphite for improving anode capacity. However, silicon, when used in anodes of lithium-ion batteries, tends to expand significantly (up to 300%) when the batteries are charged, resulting in the need for extra battery volume to accommodate the expansion of the silicon, which raises safety concerns because expansion of the anode in a confined space of battery or battery cell could cause damage to the structural integrity of the battery or battery cell, impact performance and energy density, respectively. Additionally the expansion of silicon in the anode can create adhesion problems, and introduce a need to use extra binders in the anodes. Anodes in currently available lithium-ion batteries generally constrained to a maximum silicon concentration of about 30 wt. % to avoid these issues (e.g., due to silicon expansion). Thus, above 30 wt. % silicon anodes currently represents a design constraint that has yet to be resolved when trying to improve the energy density and/or power density of lithium-ion batteries.

Furthermore, currently available lithium-ion batteries have relatively slow charging rates, which can limit their application in many areas. More specifically, because graphite used in anodes has a limited capacity per unit volume and per unit weight, N:P ratio slightly greater than unity (e.g., N:P ratio of 1.05) is generally used in commercial lithium-ion batteries to limit the footprint of the anode (graphite). With limited overage of anode capacity with respect to cathode capacity, currently available lithium-ion batteries have to be charged slowly to avoid the detrimental effects caused by over-charging. Another reason for the slow charge of currently available lithium-ion batteries is that during charge, the graphite anode reaches the lithium reduction potential, which can result in the formation of lithium dendrites under fast charging process and/or cold charging conditions.

A solution to at least some of the above mentioned problems associated with lithium-ion batteries has been discovered and enables a lithium-ion battery that comprises an anode having a silicon content of 30 to 85 wt. % to be realized. Notably, because silicon has significantly higher capacity per unit volume and per unit weight than graphite, high silicon content in the anode can help reduce the overall volume and/or weight of anode in lithium-ion batteries. This can be beneficial for at least reducing the volume of a lithium-ion battery required to reach a pre-determined capacity, resulting in improved energy density. The high concentration of silicon in anode further facilitates reduced thickness of the anode of the lithium-ion battery compared to anodes that contain low or substantially no silicon.

Additionally, the silicon material utilized to form the anode of the disclosed lithium-ion battery is configured to exhibit limited volumetric expansion when the battery is charged (or charging), thereby mitigating the need for extra battery volume to accommodate silicon expansion, reducing the risk caused by silicon expansion in the confined space of a battery, and ultimately enabling the anode silicon content of as high as 85 wt. % in a lithium-ion battery. For instance, silicon nanowires with high aspect ratio of diameter to length ratio for the silicon to expand only along the preferred direction, thus controlling the overall expansion in the battery cell. Silicon particles encapsulated by flexible graphene sheets can also be used as the graphene sheets are functioning as flexible membranes for constraining the expansion of the silicon particles. Excessive silicon in anodes can also be implemented to prevent silicon from initiating full volume expansion. Last but not the least, at least some of the silicon in the anode can be in silicon oxide form to find a balance point of anode capacity and volume expansion as silicon oxide has lower volume expansion but lower capacity compared to silicon.

Furthermore, the use of high concentration of silicon in anode, which has about 5 to 10 times capacity as graphite, can lead to high N:P ratio (negative electrode capacity to positive electrode capacity) for the disclosed lithium-ion batteries. The excessive anode capacity over cathode capacity can facilitate fast charging and/or low temperature charging of lithium-ion batteries with minimum concerns on detrimental effects. The excess silicon anode is configured to help prevent anode from reaching lithium plating potential and forming lithium dendrites. Moreover, the disclosed lithium battery can include non-flammable electrolyte, including ionic liquid, thereby enhancing the safety of the disclosed lithium ion batteries.

The disclosed lithium-ion battery, in embodiments of the invention, shows significantly improved energy density compared to currently available lithium-ion batteries while meeting safety standards required for use in various devices including, but not limited to, power tools, vacuum cleaners, lawn and garden equipment, electric vehicles, portable smart devices. According to embodiments of the invention, the lithium-ion battery can be charged at a low temperature of about 0° C. with a charging rate of up to 5 C to 10 C (e.g., charging within 12-6 minutes, respectively) and up to 4 C (i.e. 15 minutes) at a low temperature of about −20° C. due to an N:P ratio of from at least 1.2 to 4, thereby further enabling the lithium-ion battery to be used in devices and/or electric vehicles that need to be operated and charged at a low temperature environment. "Charge rate" can be defined as a current or as a "C-rate". Therefore, the disclosed lithium-ion battery provides a technical achievement over the currently available lithium-ion batteries mentioned above, such as low energy density, slow charging rate, and lack of ability recharging at low temperatures.

The following includes definitions of various terms and phrases used throughout this specification.

The terms "about" or "approximately" are defined as being close to as understood by one of ordinary skill in the art. In one non-limiting embodiment the terms are defined to be within 10%, preferably, within 5%, more preferably, within 1%, and most preferably, within 0.5%.

The terms "wt. %," "vol. %," or "mol. %" refers to a weight, volume, or molar percentage of a component, respectively, based on the total weight, the total volume, or the total moles of material that includes the component. In a non-limiting example, 10 moles of component in 100 moles of the material is 10 mol. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, includes any measurable decrease or complete inhibition to achieve a desired result.

The term "effective," as that term is used in the specification and/or claims, means adequate to accomplish a desired, expected, or intended result.

The use of the words "a" or "an" when used in conjunction with the term "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, etc., disclosed throughout the specification. With respect to the transitional phase "consisting essentially of," in one non-limiting aspect, a basic and novel characteristic of the pressure sensitive adhesives of the present invention are their ability to initiate polymer scission in response to a selected electromagnetic radiation.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 3A shows a silicon material of "egg-yolk" model is discharged; FIG. 3B shows a silicon material of "egg-yolk" model is charged.

DETAILED DESCRIPTION OF THE INVENTION

Lithium-ion batteries are used in a variety of devices and electric vehicles due to the high energy and power densities lithium-ion batteries provide. As performance and power output for these devices and electric vehicles continuously improve, the demand for batteries with higher energy densities is rapidly growing. However, a few issues, including low capacity of the anode and limited charging speed, have become bottlenecks in the development of improved lithium-ion batteries.

Graphite, which is the most commonly used material for anode found in currently available lithium-ion batteries, has a relatively low capacity per unit volume and/or per unit weight, which limits the potential for increasing power capacity within a confined space of battery cells. Over the last several years, silicon, which exhibits about five to ten times the capacity per unit volume and/or per unit weight of graphite, has been used as an additive to graphite to improve the capacity of the anode in lithium ion batteries. However, silicon in these currently available lithium-ion batteries expands significantly when the batteries are charged, resulting in a need for extra volume in lithium-ion batteries and creating safety concerns caused by silicon expansion in the batteries. The present invention provides a solution to at least some of the above-described problems associated with currently available lithium-ion batteries. The disclosed solution is premised on a lithium-ion battery that include an anode comprising more than 30 wt. %, preferably more than 40 wt. %, and as high as 85 wt. %, silicon configured to exhibit limited or negligible volume expansions when during charging, thereby mitigating safety concerns and reducing the need for extra space to accommodate silicon expansion in lithium-ion batteries.

These and other non-limiting aspects of the present invention are discussed in further detail in the following sections.

A. Lithium-Ion Battery

Figure 1:
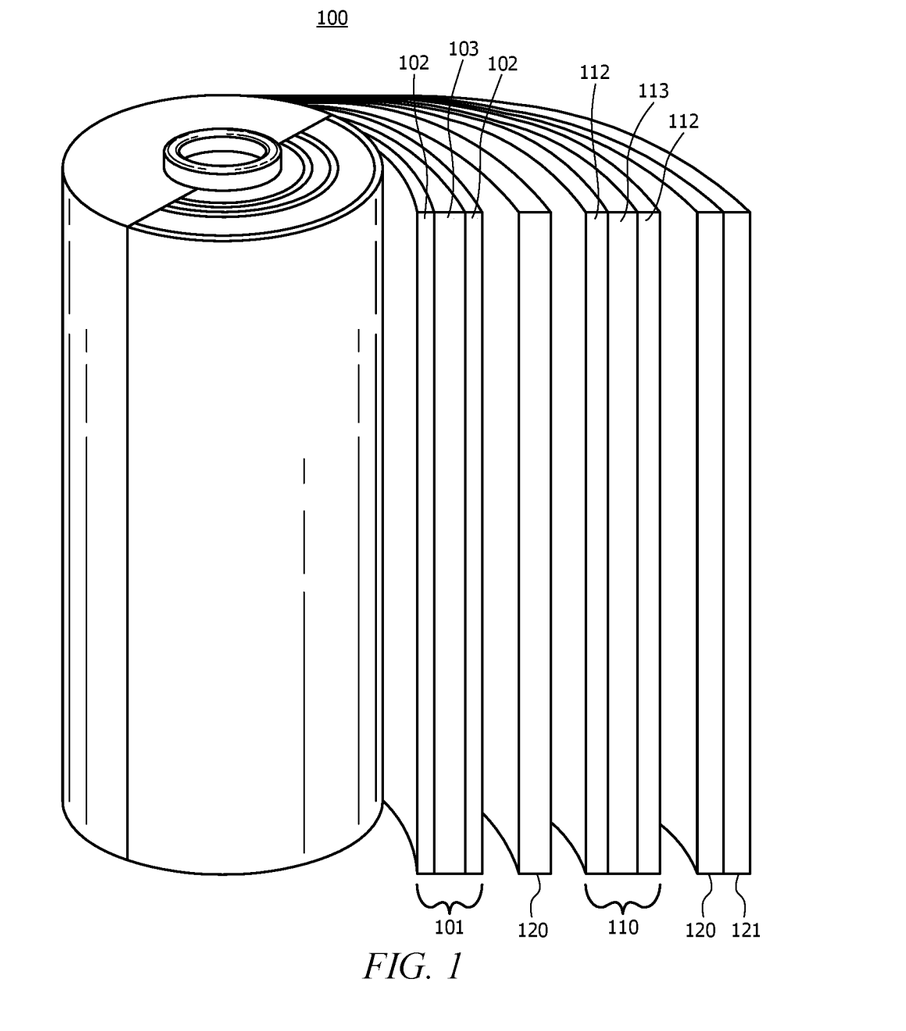
FIG. 1 shows a schematic diagram of a lithium-ion battery, according to embodiments of the invention.

In embodiments of the invention, the lithium-ion battery comprises an anode, a cathode, and an electrolyte. The lithium ion battery can have significantly improved energy density compared to conventional lithium-ion batteries. With reference to FIG. 1, a schematic diagram is shown for lithium-ion battery 100.

According to embodiments of the invention, lithium-ion battery 100 includes anode 101. Anode 101 can include anode active layer 102 comprising a silicon-based material. Non-limiting examples of the silicon-based material can include silicon, and silicon oxide (SiOx). In some instances, anode 101 comprises more than 30 wt. % of the silicon-based material. In some instances, anode 101 can include 30 to 85 wt. % of the silicon based material, and all ranges and values there between including ranges of 30 to 35 wt. %, 35 to 40 wt. %, 40 to 45 wt. %, 45 to 50 wt. %, 50 to 55 wt. %, 55 to 60 wt. %, 60 to 65 wt. %, 65 to 70 wt. %, 70 to 75 wt. %, 75 to 80 wt. %, and 80 to 85 wt. %. In some other aspects, anode 101 can include 75 to 85 wt. % of the silicon based material. The silicon based material of anode 101 can be configured to expand less than 50 vol. % when lithium-ion battery 100 is charging or charged. In some aspects, anode 101 including silicon may expand by 50 to 100 vol. % during entire charging process, depending on type(s) of silicon material used in anode 101 In embodiments of the invention, anode 101 comprising 30 to 85 wt. % of the silicon based material can be configured to have up to 10 times anode capacity compared to a graphite anode that does not include silicon, and up to 5 times the anode capacity compared to a graphite anode that has a silicon concentration of 30 wt. %. In some instances, anode 101 with 30 wt. % silicon can have up to 700 mAh/g capacity and anode 101 with 85 wt. % silicon can have 3400 mAh/g capacity, which is 10 times higher than the capacity of graphite.

Figure 2:
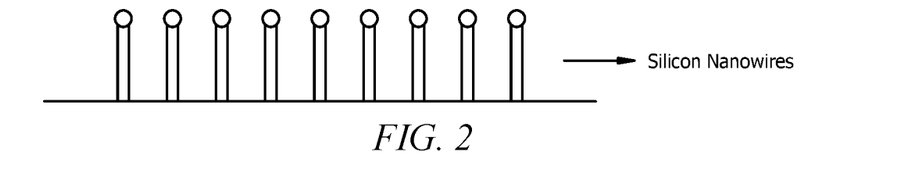
FIG. 2 shows a schematic diagram of silicon nanowires that can be used as a base material for an anode of a lithium-ion battery, according to embodiments of the invention.
Figure 4A:
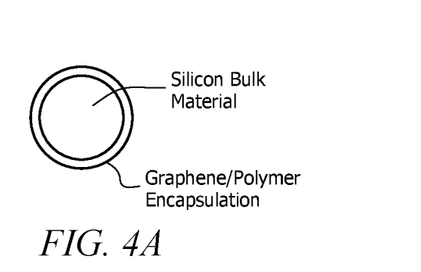
FIGS. 4A and 4B show aspects of a silicon particle (silicon bulk material) encapsulated by graphene and/or polymer for anode of a lithium-ion battery, according to embodiments of the invention when discharged and when charged, respectively.
Figure 4B:
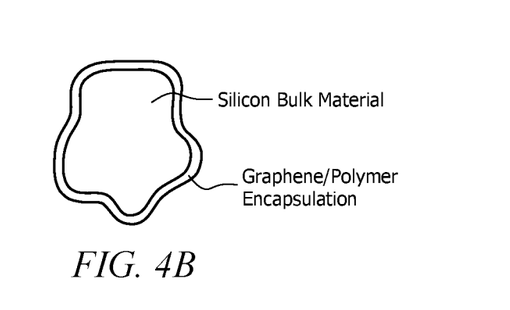

In some aspects, the silicon based material of anode 101 can include silicon nanowires (as shown in FIG. 2), silicon encapsulated in carbon (as shown in FIGS. 4A and 4B), a silicon and graphene blend, a silicon and elastic polymer mixture, silicon oxide, or any combination thereof. Silicon nanowires of anode 101 can further include a dopant deposited there over. Non-limiting examples of the dopant can include Tin, Germanium, Iron, Aluminum, Magnesium, or any combination thereof. The passivation agent may be in a form of nanoparticles. In some aspects, the silicon nanowires can have an average diameter in a range of 100 to 1000 nm and all ranges and values there between. In some instances, the silicon nanowires of anode 101 can be produced via etching, chemical vapor deposition, physical vapor deposition, precipitation, and/or ablation.

Figure 3A:
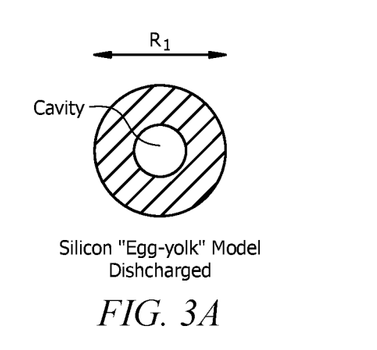
FIGS. 3A and 3B show schematics of silicon "egg-yolk" model configured to mitigate volume expansion when a lithium-ion battery is charged or charging.
Figure 3B:
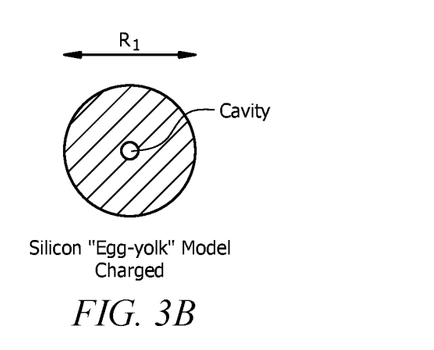

In some aspects, silicon based material of anode 101 can be configured in an "egg-yolk" configuration that follows an "egg-yolk" model as shown in FIGS. 3A and 3B. As shown in FIG. 3A, the silicon based material having the "egg-yolk" configuration can have a cavity in an inner portion thereof. When lithium-ion battery 100 is charged, the cavity can shrink to accommodate the expansion of silicon while keep the overall volume substantially unchanged (e.g., the overall diameter $R_1$ of the silicon may be substantially the same when it is charged and discharged, as shown in FIGS. 3A and 3B). When lithium-ion battery 100 is discharged, the expansion of the silicon maybe substantially reversed and the cavity may recover substantially to its original size.

In some aspects, the silicon based material of anode 101 can include silicon encapsulated in carbon and the silicon encapsulated in carbon can include silicon particles (silicon bulk material) with an average diameter of 0.5 to 10 μm and all ranges and values there between including ranges of 0.5 to 1 μm, 1 to 1.5 μm, 1.5 to 2.0 μm, 2.0 to 2.5 μm, 2.5 to 3.0 μm, 3.0 to 3.5 μm, 3.5 to 4.0 μm, 4.0 to 4.5 μm, 4.5 to 5.0 μm, 5.0 to 5.5 μm, 5.5 to 6.0 μm, 6.0 to 6.5 μm, 6.5 to 7.0 μm, 7.0 to 7.5 μm, 7.5 to 8.0 μm, 8.0 to 8.5 μm, 8.5 to 9.0 μm, 9.0 to 9.5 μm, 9.5 to 10 μm. The silicon encapsulated in carbon can have an overall silicon to carbon weight ratio in a range of 0.1 to 4 and all ranges and values there between including ranges of 0.1 to 0.4, 0.4 to 0.8, 0.8 to 1.2, 1.2 to 1.6, 1.6 to 2.0, 2.0 to 2.4, 2.4 to 2.8, 2.8 to 3.2, 3.2 to 3.6, and 3.6 to 4.0. The carbon that encapsulates silicon can include graphite, graphene, carbon ash, or any combination thereof. In embodiments of the invention, the silicon encapsulated in carbon is produced via etching, chemical vapor deposition (CVD), physical vapor deposition (PVD), precipitation, and ablation. As shown in FIGS. 4A and 4B, when lithium-ion battery 100 is charged, the graphene and/or polymer encapsulation layer may be configured to constrain expansion of silicon, resulting in mitigated silicon expansion in lithium-ion battery 100. When lithium-ion battery 100 is discharged, the silicon particles and the graphene and/or polymer encapsulation layer may recover substantially to their original shapes.

In some aspects, the silicon based material of anode 101 can include a silicon-graphene blend, and the silicon-graphene blend can have a silicon to graphene weight ratio in a range of 0.1 to 4 and all ranges and values there between including ranges of 0.1 to 0.4, 0.4 to 0.7, 0.7 to 1, 1 to 1.3, 1.3 to 1.6, 1.6 to 1.9, 1.9 to 2.2, 2.2 to 2.5 to 2.8, 2.8 to 3.1, 3.1 to 3.4, 3.4 to 3.7, and 3.7 to 4.0. In some instances, the silicon-graphene blend may have an average particle size of 0.5 to 10 μm and all ranges and values there between including ranges of 0.5 to 1.0 μm, 1.0 to 2.0 μm, 2.0 to 3.0 μm, 3.0 to 4.0 μm, 4.0 to 5.0 μm, 5.0 to 6.0 μm, 6.0 to 7.0 μm, 7.0 to 8.0 μm, 8.0 to 9.0 μm, and 9.0 to 10 μm. The silicon particles of the silicon-graphene blend can be unimodal or bimodal in nature. The silicon particles of the silicon-graphene blend can be spherical, ellipsoid, cylindrical, orthogonal, or a combinations thereof.

In some aspects, the silicon based material of anode 101 can include a silicon and elastic polymer mixture having a silicon to polymer weight ratio in a range of 0.5 to 6 and all ranges and values there between including ranges of 0.5 to 1, 1 to 1.5, 1.5 to 2.0, 2.0 to 2.5, 2.5 to 3.0, 3.0 to 3.5, 3.5 to 4.0, 4.0 to 4.5, 4.5 to 5.0, 5.0 to 5.5, and 5.5 to 6.0. Non-limiting examples for the elastic polymer can include polyacrylic acid, carboxymethyl cellulose, and combinations thereof. In some instances, the silicon and elastic polymer mixture is in powder form with spherical and/or ellipsoid particles. In embodiments of the invention, the silicon and elastic polymer mixture is produced via precipitation, mixing, baking, and/or any combination thereof. In embodiments of the invention, encapsulation of silicon particles may not change the shape of the silicon nanoparticles.

In embodiments of the invention, anode active layer 102 further includes a carbon based material. The carbon based material can be mixed with the silicon based material and/or coated over the silicon based material. The carbon-based material is configured to prevent expansion and/or improve conductivity of the silicon based material. Non-limiting examples of the carbon based material can include graphite, graphene, carbon ash, and combinations thereof. In some instances, the carbon-based material may be coated on the silicon via precipitation, mixing, baking, CVD, PVD, or any combination thereof. In some instances, coating of the carbon-based material over the silicon based material can have a thickness in a range of 5 to 1000 nm and all ranges and values there between including ranges of 5 to 10 nm, 10 to 20 nm, 20 to 30 nm, 30 to 40 nm, 40 to 50 nm, 50 to 60 nm, 60 to 70 nm, 70 to 80 nm, 80 to 90 nm, 90 to 100 nm, 100 to 200 nm, 200 to 300 nm, 300 to 400 nm, 400 to 500 nm, 500 to 600 nm, 600 to 700 nm, 700 to 800 nm, 800 to 900 nm, and 900 to 1000 nm. In embodiments of the invention, the silicon based material in anode 101 is further mixed with a secondary material. Non-limiting examples of the secondary material can include tin, antimony, germanium, and combinations thereof. The secondary material can be mixed with silicon at a silicon-to-secondary material weight ratio of 1:100 to 100:1 and all ranges and values there between.

In embodiments of the invention, anode 101 comprises first metal layer 103. First metal layer 103 can include a metal sheet and/or a metal foil. In some instances, first metal layer 103 includes copper. In embodiments of the invention, anode active layer 102 comprising the silicon based material and/or the carbon based material is coated on one or both surfaces of first metal layer 103. In some aspects, anode active layer 102 is coated on first metal layer 103. The thickness of anode active layer 102 can be determined based on a target capacity for anode 101. In some instances, the thickness of anode active layer 102 on first metal layer 103 can be in a range of 10 to 50 μm and all ranges and values there between including ranges of 10 to 12 μm, 12 to 14 μm, 14 to 16 μm, 16 to 18 μm, 18 to 20 μm, 20 to 22 μm, 22 to 24 μm, 24 to 26 μm, 26 to 28 μm, 28 to 30 μm, 30 to 32 μm, 32 to 34 μm, 34 to 36 μm, 36 to 38 μm, 38 to 40 μm, 40 to 42 μm, 42 to 44 μm, 44 to 46 μm, 46 to 48 μm, and 48 to 50 μm. In some aspects, anode active layer 102 is coated on first metal layer 103 via a process of doctor blade, slot die coater, comma coater, or any combinations thereof.

According to embodiments of the invention, lithium-ion battery 100 comprises cathode 110. Cathode 110, in embodiments of the invention, includes cathode active layer 112 comprising a lithium metal oxide. In some aspects, the lithium metal oxide of cathode 110 can have a formula of $Li_aNi_xA_yB_zO_2$ where $a≥1$, $x≥0.5$, $y+z=1-x$. Non-limiting examples for A can include Manganese (Mn), Cobalt (Co), Aluminum (Al), and combinations thereof. Non-limiting examples for B can include Cobalt (Co), Manganese (Mg), Aluminum (Al), and combinations thereof. In some instances, the ratio of x:y:z can be 6:2:2, 8:1:1, or 9:0.5:0.5. It should be appreciated that the ratio of x:y:z is not limited to the aforementioned three examples, which have been provided for purposes of illustration, rather than by way of limitation. In some instances, cathode 110 includes Lithium, Nickel, Manganese, Cobalt oxide, or Lithium, Nickel, Cobalt, Aluminum oxide. In some other instances, cathode 100 includes Lithium Nickel oxide, or Lithium Manganese oxide.

Figure 5:
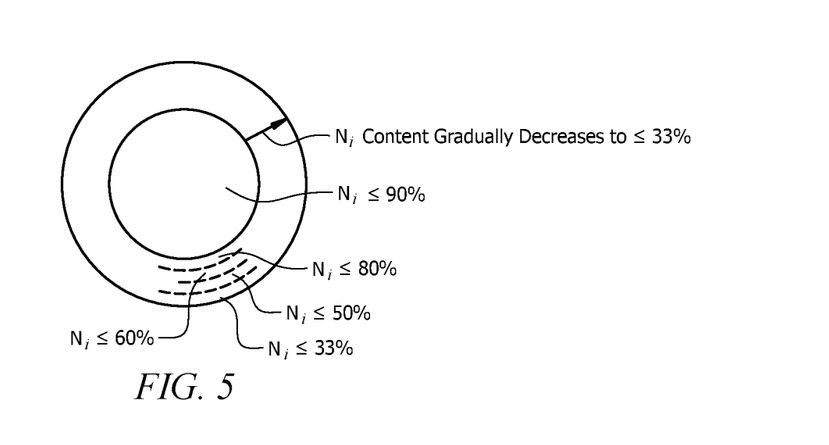
FIG. 5 shows a schematic of a core-shell configuration of lithium metal oxide with a nickel gradient from a core portion to an outer surface of a shell portion.

In some aspects, the lithium metal oxide of cathode 110 is in a core-shell gradient structure with a concentration of Ni increasing from an outer shell to a core of the core-shell gradient structure, as shown in FIG. 5. In some instances, as shown in FIG. 5, a core portion of the core-shell structure of the lithium metal oxide of cathode 110 may include up to 80 wt. % Ni, and Ni concentration of a shell portion may decrease from up to about 80 wt. % in an inner layer of the shell portion to up to 33 wt. % in an outer layer of the shell portion. The core-shell gradient structure of the lithium metal oxide can be produced via a co-precipitation process. In some aspects, the lithium metal oxide may include dopants or a surface coating. Non-limiting examples for the dopants or the surface coating can include carbon, zirconium, aluminum, germanium, and combinations thereof.

In embodiments of the invention, cathode 110 includes second metal layer 113 and cathode active layer 112 is coated on one or both side of second metal layer 113 (It should be appreciated that second metal layer 113 refers to the metal layer used in cathode 110, with the term "second" being used to differentiate the metal layer 113 of the cathode from the first metal layer of the anode. Thus the term "second" should not be understood to require the cathode 110 to include two metal layers). In some aspects, second metal layer 113 includes aluminum. Cathode active layer 112 can be coated on second metal layer 113 at a thickness of 20 to 100 micron (per side of second metal layer 113) and all ranges and values there between. Cathode active layer 112 may be coated on second metal layer 113 via a comma coater, a slot die coater, or a doctor blade.

According to embodiments of the invention, lithium-ion battery 100 comprises an electrolyte disposed between anode 101 and cathode 110. The electrolyte can be a non-flammable electrolyte. In some aspects, the non-flammable electrolyte comprises an ionic liquid. The ionic liquid can be protic or aprotic. The ionic liquid includes a cation and an anion. Non-limiting examples of the cation can include imidazolium, pyridinium, pyrrolidinium, piperidinium, and combinations thereof. Non-limiting examples of the anon can include bromides, chlorides, iodides, phosphates, $BF_4^-$, $PF_6^-$, $TFSI^-$, $FSI^-$, and combinations thereof.

In embodiments of the invention, in response to temperature increases, certain ionic compounds become liquids as a result of a thermal activation. A salt in this state is generally denoted as "molten salt" some of which remain liquid at ambient temperature even at a very low temperature. In some aspects, such molten salts are called as "ambient temperature ionic liquid" or "ionic liquid". The ionic liquid of the electrolyte is configured to improve thermal stability and mitigating safety issues including, but not limited to, short-circuit, overcharge, crush leading to fire or explosion.

According to embodiments of the invention, lithium-ion battery 100 further includes separator 120 disposed between anode 101 and cathode 110, and configured to prevent contact between anode 101 and cathode 110. Separator 120 can include polyethylene (PE), and/or polypropylene (PP). Separator 120 may be coated with ceramics including aluminum oxide, and/or zirconium oxide configured to improve mechanical strength thereof. According to embodiments of the invention, lithium-ion battery 100 includes housing 121 configured to enclose anode 101, cathode 110, separator 120, and the electrolyte. In some aspects, housing 121 can comprise polyethylene coated aluminum, nickel coated steel, aluminum, steel, or any combination thereof.

In embodiments of the invention, compared to the highest energy density of 550 to 600 Wh/L achieved by currently available lithium-ion batteries, lithium-ion battery 100 is configured to have an energy density in a range of 750 to 900 Wh/L and all ranges and values there between including ranges of 750 to 760 Wh/L, 760 to 770 Wh/L, 770 to 780 Wh/L, 780 to 790 Wh/L, 790 to 800 Wh/L, 800 to 810 Wh/L, 810 to 820 Wh/L, 820 to 830 Wh/L, 830 to 840 Wh/L, 840 to 850 Wh/L, 850 to 860 Wh/L, 860 to 870 Wh/L, 870 to 880 Wh/L, 880 to 890 Wh/L, and 890 to 900 Wh/L. With respect to energy per kilogram, lithium-ion battery 100 is configured to have an energy density of 250 to 450 Wh/kg and all ranges and values there between including ranges of 250 to 260 Wh/kg, 260 to 270 Wh/kg, 270 to 280 Wh/kg, 280 to 290 Wh/kg, 290 to 300 Wh/kg, 300 to 310 Wh/kg, 310 to 320 Wh/kg, 320 to 330 Wh/kg, 330 to 340 Wh/kg, 340 to 350 Wh/kg, 350 to 360 Wh/kg, 360 to 370 Wh/kg, 370 to 380 Wh/kg, and 380 to 390 Wh/kg, 390 to 400 Wh/kg, 400 to 410 Wh/kg, 410 to 420 Wh/kg, 420 to 430 Wh/kg, 430 to 440 Wh/kg, and 440 to 450 Wh/kg.

In embodiments of the invention, lithium-ion battery 100 can have an N:P ratio (i.e., the ratio of a negative electrode (anode 101) capacity to a positive electrode (cathode 110) capacity) in a range of 1.2 to 4 and all ranges and values there between including ranges of 1.2 to 1.6, 1.6 to 2.0, 2.0 to 2.4, 2.4 to 2.8, 2.8 to 3.2, 3.2 to 3.6, and 3.6 to 4.0. The high N:P ratio is configured to facilitate fast charging of lithium-ion battery 100. In some aspects, fast charging of lithium-ion battery is conducted at a 4 to 10 C-rate, which corresponds to 15 to 6 minutes for charge, respectively and is up to 5 times faster than currently available batteries (e.g., currently available 21700 batteries). In some aspects, the high N:P ratio for lithium-ion battery is further configured to facilitate charging of lithium-ion battery 100 at a low temperature range of −20 to 0° C. with 50% charging rate of at 25° C.

Although FIG. 1 shows a lithium-ion battery in a cylindrical cell format, it should be appreciated that lithium-ion battery 100 can be in various cell configurations including, but not limited to, cylindrical cell, a prismatic cell, and a pouch cell. In some instances, lithium-ion battery 100 can be configured in a cylindrical 21700 cell format, which has a diameter of about 21 mm and a length about 70 mm. In some aspects, lithium-ion battery 100 in cylindrical 21700 cell format can have a power capacity of 6 Ah. A higher limit of power capacity for currently available 21700 cell format is 4 Ah, and it would require significant research work for currently available 21700 cell to reach 5 Ah power capacity. Therefore, lithium-ion battery 100 of the invention provide significant technical achievement over currently available lithium-ion batteries.

The lithium-ion battery 100 in cylindrical 21700 cell format can have an Alternating Current Internal Resistance (ACIR) of less than 15 mOhms, and a Direct Current Internal Resistance (DCIR) of less than 25 mOhms. In some aspects, the cylindrical 21700 cell of lithium-ion battery 100 that has 6 Ah power capacity has a discharge rate capability of up to about 30 A continuous power and a pulse power capability of 100 A for 2 seconds. This represents significant improvement over currently available 21700 lithium-ion batteries, which are at best capable of providing 3 A continuous power and a pulse power of 8 A for 2 seconds.

In some instances, lithium-ion battery 100 can be configured in a cylindrical 18650 cell format, which has a diameter of about 18 mm and a length of about 65 mm. Lithium-ion battery of the cylindrical 18650 cell format can have an ACIR of less than 20 mOhms, and a DCIR of less than 30 mOhms. Although the characteristics of lithium-ion battery 100 in 21700 and 18650 cell formats have been described, it should be appreciated that embodiments may also be implemented in other cell formats to provide similar improvements although the specific numerical values of the continuous discharge rate, pulse discharge rate, power capacity (Ah), DCIR, and/or ACIR may change depending on the specific cell format. In some aspects, the cylindrical 18650 cell of lithium-ion battery 100 that has 4 Ah power capacity has a discharge rate capability of up to 5 C continuous without hitting voltage or temperature cut-off limit and a pulse power of up to 16 C without hitting any of the voltage or temperature cut-off limit.

In some aspects, lithium-ion battery 100 is configured to be used in a power tool. Non-limiting examples of the power tool can include a drill, a saw, a grass trimmer, a blower, and a sander. It should be appreciated that use of lithium-ion battery 100 is not so limited. Batteries configured to provide high power and high energy density in accordance with concepts herein may, for example, be utilized in powering such devices as portable smart devices, portable computational devices, electric vehicles, backup/uninterruptable power supplies, etc. In embodiments of the invention, lithium-ion battery 100 meets safety standards required for being used in the aforementioned devices. Non-limiting examples of the safety standards can include UN/DOT 38.3, $5^{th}$ Edition, Amendment 1-*Recommendations on the Transport of Dangerous Goods*, IEC 62133-2:2017-*Safety requirements for portable sealed secondary lithium cells, and for batteries made from them, for use in portable applications—Part 2: Lithium systems*, and UL 2054 $2^{nd}$ Edition—*Household and Commercial Batteries*.

B. Method of Producing Lithium-ion Battery

Figure 6:
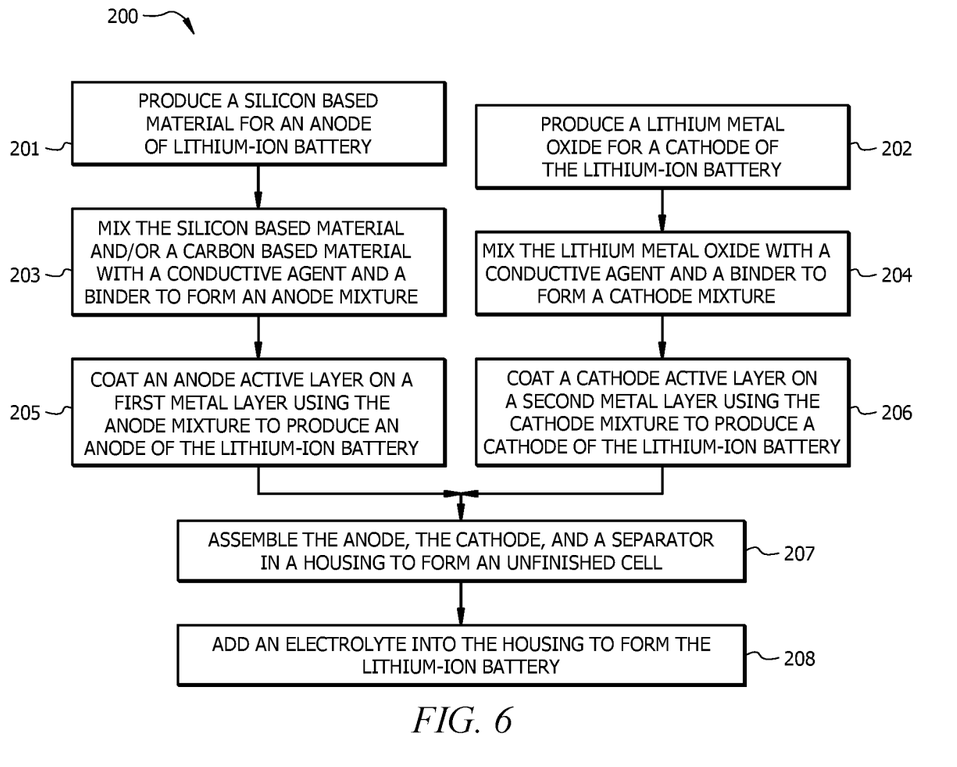
FIG. 6 shows a schematic flowchart of a method for producing a lithium-ion battery, according to embodiments of the invention.

In embodiments of the invention, there are provided methods of producing aforementioned lithium-ion battery 100, which can comprise anode 101 having 30 to 85 wt. % the silicon based material. According to embodiments of the invention, method 200 (as shown in FIG. 6) for producing lithium-ion battery 100 can include, as shown in block 201, producing the silicon based material of anode 101 lithium-ion battery 100.

In some aspects, the silicon based material comprises silicon nanowires and the producing step at block 201 includes fabricating silicon nanowires via etching, chemical vapor deposition, physical vapor deposition, precipitation, and/or ablation. In some instances, surfaces of the silicon nanowires are further functionalized with a functional group. The functional group can include oxide, nitrides groups, or any combinations thereof. The silicon nanowires can further includes a dopant such as Magnesium (Mg).

In some aspects, the silicon based material comprises silicon encapsulated in carbon and the producing step at block 201 includes encapsulating silicon with carbon via thermal baking, physical vapor deposition, chemical vapor deposition. In embodiments of the invention, the silicon to be encapsulated at block 201 is produced via etching, chemical vapor deposition, physical vapor deposition, precipitation, or ablation.

In some aspects, the silicon based material comprises silicon mixed with elastic polymer and the producing step at block 201 includes mixing an elastic polymer with a silicon bulk material to form a substantially uniform mixture of silicon and the elastic polymer. In some instances, the elastic polymer includes etching, chemical vapor deposition, physical vapor deposition, precipitation, ablation. or any combination thereof. The mixing can include physical mixing, and heating.

According to embodiments of the invention, as shown in block 202, method 200 includes producing the lithium metal oxide of cathode 110. In some aspects, producing at block 202 can include solid state reaction between manganese oxide, nickel oxide, cobalt oxide and lithium carbonate. The solid state reaction for producing lithium metal oxide can be conducted at a temperature of 450 to 800° C. The produced lithium metal oxide can be in powder form.

According to embodiments of the invention, as shown in block 203, method 200 includes mixing the silicon based material and/or the carbon based material of anode 101 with a conductive agent and a binder to form an anode mixture. As shown in block 204, method 200 can include mixing the lithium metal oxide with a conductive binder to form a cathode mixture. The anode mixture and/or the cathode mixture can be in form of slurry. In some aspects, at block 203, the anode mixture is formed with a weight ratio of the silicon based material to the conductive agent and binder in a range of 0.8 to 0.95. In some aspects, at block 204, the cathode mixture is formed with a weight ratio of the lithium metal oxide to conductive agent and binder in a range of 0.88 to 0.97. In embodiments of the invention, anode mixture comprises no less than 30 wt. % silicon. Non-limiting examples of the conductive agent can include carbon black, acetylene black, ketjan black, Super P, carbon nanotubes, and combinations thereof. Non-limiting examples of the binder can include polyvinylidene fluoride (PVDF), carboxymethyl cellulose/styrene-butadiene rubber (CMC/SBR), polyacrylic acid (PAA), and combinations thereof.

According to embodiments of the invention, as shown in block 205, method 200 includes coating anode active layer 102 on first metal layer 103 using the anode mixture. As shown in block 206, method 200 can include coating cathode active layer 112 on second metal layer 113 using the cathode mixture. In some aspects, at block 205, the coating step can include spreading anode mixture on first metal layer 103. At block 206, the coating step can include spreading cathode mixture on second metal layer 113. The coating step at block 205 can further include compressing the anode mixture on first metal layer 103. At block 206, the coating step can include compressing the cathode mixture on second metal layer 113 to adjust thickness thereof. The coating steps at blocks 205 and 206 can further include drying the anode mixture on first metal layer 103 and drying the cathode mixture on second metal layer 113 after the compressing step, respectively. The coating steps at blocks 205 and 206 can further still include cutting the dried anode mixture along with first metal layer 103 and cutting the dried cathode mixture along with second metal layer 113 into desired shape and/or size, thereby forming anode 101 and cathode 110, respectively. Anode 101 produced at block 205 can include 30 to 85 wt. % silicon, preferably 40 to 85 wt. % silicon and all ranges and values there between including ranges of 40 to 45 wt. %, 45 to 50 wt. %, 50 to 55 wt. %, 55 to 60 wt. %, 60 to 65 wt. %, 65 to 70 wt. %, 70 to 75 wt. %, 75 to 80 wt. %, and 80 to 85 wt. %.

According to embodiments of the invention, as shown in block 207, method 200 includes assembling anode 101, cathode 110, separator 120, in housing 121 to form an unfinished cell. In some aspects, the assembling step at block 207 includes laminating anode 101, separator 120, cathode 110 to form an electrode structure, connecting anode 101 and cathode 110 of the electrode structure to corresponding terminals. In some aspects, safety devices and/or vents may be connected and/or disposed on the electrode structure and/or terminals to form an subassembly. Assembling at block 207 can include inserting the subassembly into housing 121, and sealing housing 121. In some aspects, at least one opening is left on housing 121 after it is sealed.

According to embodiments of the invention, as shown in block 208, method 200 includes adding the electrolyte into sealed housing 121 to form lithium-ion battery 100. In some aspects, the adding electrolyte step at block 206 can include drying sealed housing 121 obtained from block 205 in vacuum, filling electrolyte into dried sealed housing 121 through the at least one opening in vacuum, and sealing the at least one opening of housing 121 to form lithium-ion battery 100.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

What is claimed is:
1. A lithium-ion battery cell comprising:
  a cathode comprising a lithium metal oxide active material, wherein the lithium metal oxide active material comprises nickel, and wherein the lithium metal oxide active material has a formula of $Li_aNi_xA_yB_zO_2$ where a=1, 0.5≤x≤0.8, y+z=1−x, wherein A is selected from the group consisting of Mn, Co, Ni, Al, and combinations thereof, and B is selected from the group consisting of Co, Mn, Ni, Al, and combinations thereof, and wherein the lithium metal oxide active material includes up to 80 wt. % Ni;

an anode comprising 31 to 85 wt. % silicon active material, wherein the silicon active material comprises at least one of:

silicon nanowires configured to mitigate expansion of the silicon active material having an average diameter in a range of 100 to 1000 nm and an aspect ratio of diameter to length ratio configured for the silicon nanowires to expand only along a direction selected to control an overall expansion in the lithium-ion battery cell;

silicon particles encapsulated in an encapsulation layer configured to constrain expansion of the silicon active material during charging of the lithium-ion battery cell and to recover to their original shapes when the lithium-ion battery cell is in the discharged state, wherein the encapsulation layer comprises graphene, an elastic polymer comprising polyacrylic acid, an elastic polymer comprising carboxymethyl cellulose, silicon oxide, or a combination thereof encapsulating the silicon particles; or silicon-based material formed to comprise an inner cavity portion surrounded by the silicon-based material such that when the lithium-ion battery cell is in the discharged state, the inner cavity portion has a first volume and the silicon-based material that surrounds the inner cavity portion has a first diameter and when the lithium-ion battery cell is in a charged state, the inner cavity portion has a second volume and the silicon-based material that surrounds the inner cavity portion has a second diameter, and wherein the first volume is greater than the second volume and the first diameter and the second diameter are substantially the same; and an electrolyte disposed between the anode and the cathode, wherein the electrolyte includes an ionic liquid.

2. The lithium-ion battery cell of claim 1, wherein the lithium metal oxide active material comprises nickel (Ni) and is in a core-shell gradient structure with a concentration of the Ni increasing within a shell of the core-shell gradient structure from an outer portion of the shell to a core of the core-shell gradient structure.

3. The lithium-ion battery cell of claim 1, wherein the lithium-ion battery cell is configured to have a volume energy density of 800 to 900 Wh/L.

4. The lithium-ion battery cell of claim 1, wherein the lithium-ion battery cell is configured to have a weight energy density in a range of 250 to 450 Wh/kg.

5. A lithium-ion battery cell comprising:

a cathode comprising a lithium metal oxide active material, wherein the lithium metal oxide active material comprises nickel, and wherein the lithium metal oxide active material has a formula of $Li_aNi_xA_yB_zO_2$ where a=1, 0.5≤x≤0.8, y+z=1−x, wherein A is selected from the group consisting of Mn, Co, Ni, Al, and combinations thereof, and B is selected from the group consisting of Co, Mn, Ni, Al, and combinations thereof, and wherein the lithium metal oxide active material includes up to 80 wt. % Ni;

an anode comprising 31 to 85 wt. % silicon active material configured to limit volume expansion of the silicon active material of the anode, during charging of the lithium-ion battery cell, to less than 50 percent volume (50 vol. %) increase over a volume of the silicon active material when the lithium-ion battery cell is in a discharged state, wherein the silicon active material of the anode comprises silicon nanowires having an average diameter in a range of 100 to 1000 nm and an aspect ratio of diameter to length ratio configured for the silicon nanowires to expand only along a direction selected to control an overall expansion in the lithium-ion battery cell to mitigate expansion of the silicon active material; and an electrolyte disposed between the anode and the cathode.

6. The lithium-ion battery cell of claim 5, wherein the anode is configured to have a capacity per unit volume between 3400-4200 mAh/g and the lithium-ion battery cell is configured to have a volume energy density of 800 to 900 Wh/L and an N:P ratio in a range of 2.0 to 4.0, and wherein the N:P ratio represents an area capacity ratio of the anode to the cathode.

7. The lithium-ion battery cell of claim 5, wherein a silicon material of the silicon nanowires comprises a dopant including tin, germanium, iron, aluminum, magnesium, or any combination thereof.

8. A lithium-ion battery cell comprising:

a cathode comprising a lithium metal oxide active material, wherein the lithium metal oxide active material comprises nickel, and wherein the lithium metal oxide active material has a formula of $Li_aNi_xA_yB_zO_2$ where a=1, 0.5≤x≤0.8, y+z=1−x, wherein A is selected from the group consisting of Mn, Co, Ni, Al, and combinations thereof, and B is selected from the group consisting of Co, Mn, Ni, Al, and combinations thereof, and wherein the lithium metal oxide active material includes up to 80 wt. % Ni;

an anode comprising 31 to 85 wt. % silicon active material configured to limit volume expansion of the silicon active material of the anode, during charging of the lithium-ion battery cell, to less than 50 percent volume (50 vol. %) increase over a volume of the silicon active material when the lithium-ion battery cell is in a discharged state, wherein the silicon active material of the anode comprises silicon particles encapsulated in an encapsulation layer configured to constrain expansion of the silicon active material during charging of the lithium-ion battery cell and to recover to their original shapes when the lithium-ion battery cell is in a discharged state, wherein the encapsulation layer comprises graphene, an elastic polymer comprising polyacrylic acid, an elastic polymer comprising carboxymethyl cellulose, or a combination thereof encapsulating the silicon particles; and an electrolyte disposed between the anode and the cathode.

9. The lithium-ion battery cell of claim 8, wherein the encapsulation layer comprises the graphene, and wherein the graphene comprises flexible graphene sheets functional as flexible membranes constraining the expansion of the silicon particles.

10. A lithium-ion battery cell comprising:

a cathode comprising a lithium metal oxide active material;

an anode comprising 31 to 85 wt. % silicon active material configured to limit volume expansion of the silicon active material of the anode, during charging of the lithium-ion battery cell, to less than 50 percent volume (50 vol. %) increase over a volume of the silicon active material when the lithium-ion battery cell is in a discharged state, wherein the silicon active material comprises silicon-based material formed to comprise an inner cavity portion surrounded by the silicon-based material such that when the lithium-ion battery cell is in the discharged state, the inner cavity portion has a first volume and the silicon-based material that surrounds the inner cavity portion has a first diameter and when the lithium-ion battery cell is in a charged state, the inner cavity portion has a second volume and the silicon-based material that surrounds the inner cavity portion has a second diameter, and wherein the first volume is greater than the second volume and the first diameter and the second diameter are substantially the same; and an electrolyte disposed between the anode and the cathode.

11. The lithium-ion battery cell of claim 10, wherein the anode is configured to have a capacity per unit volume between 3400-4200 mAh/g.

12. The lithium-ion battery cell of claim 10, wherein the lithium-ion battery cell is configured to have a volume energy density of 800 to 900 Wh/L and an N:P ratio in a range of 2.0 to 4.0, and wherein the N:P ratio represents an area capacity ratio of the anode to the cathode.

13. The lithium-ion battery cell of claim 10, wherein the lithium metal oxide active material comprises nickel, and wherein the lithium metal oxide active material has a formula of $Li_aNi_xA_yB_zO_2$ where a=1, 0.5≤x≤0.8, y+z=1−x, wherein A is selected from the group consisting of Mn, Co, Ni, Al, and combinations thereof, and B is selected from the group consisting of Co, Mn, Ni, Al, and combinations thereof, and wherein the lithium metal oxide active material includes up to 80 wt. % Ni.

14. The lithium-ion battery cell of claim 10, wherein the electrolyte comprises an ionic liquid.

* * * * *